V. GRETTER.

CASING SPEARS FOR USE IN OIL-WELLS.

No. 7,841. Reissued Aug. 14, 1877.

Witnesses.

R. C. Wrenshall
John K. Smith

Inventor.

Victor Gretter
by Bakewell & Kerr
Attys

UNITED STATES PATENT OFFICE.

VICTOR GRETTER, OF RICHLAND TOWNSHIP, (ST. PETERSBURG P. O.,) CLARION COUNTY, PENNSYLVANIA.

IMPROVEMENT IN CASING-SPEARS FOR USE IN OIL-WELLS.

Specification forming part of Letters Patent No. 143,141, dated September 23, 1873; Reissue No. 5,956, dated July 7, 1874; Reissue No. 7,841, dated August 14, 1877; application filed July 16, 1877.

*To all whom it may concern:*

Be it known that I, VICTOR GRETTER, of Richland township, (St. Petersburg P. O.,) in the county of Clarion and State of Pennsylvania, have invented a new and useful Improvement in Casing-Spears; and I do hereby declare the following to be a full, clear, and exact description thereof, reference being had to the accompanying drawings, forming part of this specification, in which—

Figure 1:
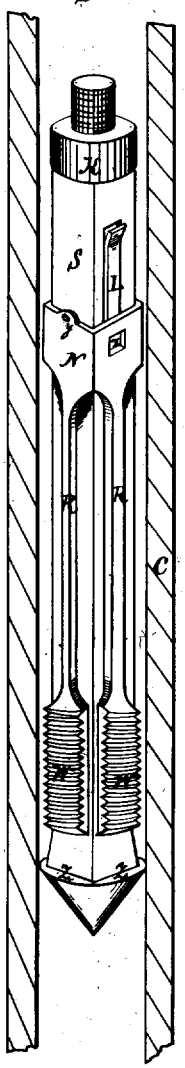
Figure 3:
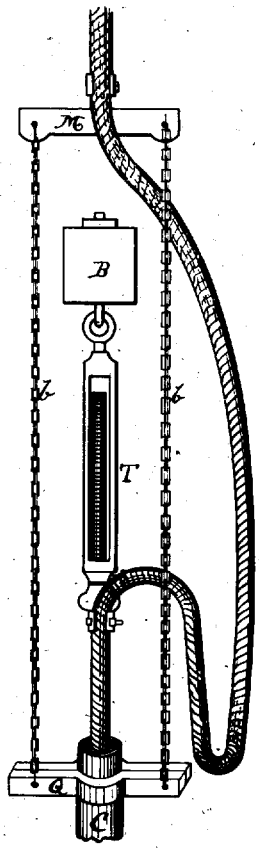
Figure 2:
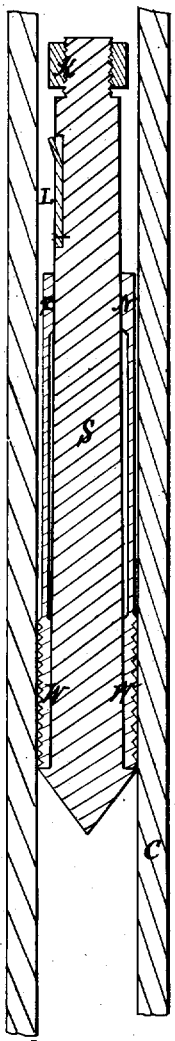

Figure 1 is an elevation of a casing-spear embodying my invention, and also a sectional view of casing. Fig. 2 is a sectional view of same, and Fig. 3 shows devices for supporting the weight of the casing during the operation of my devices.

Like letters refer to like parts wherever they occur.

My invention relates to the construction and operation of casing-spears for the removal of casing; and consists, first, in so constructing the tool that it can be made to take a firm gripe at any point within the casing, and, at the same time, one which can be loosened to allow of the withdrawal of the tool at will; secondly, in so constructing the spear that its wickers or wedges cannot escape or be lost in the well; and, thirdly, in supporting the casing from above while the jarring is done, and in devices therefor, whereby any risk of telescoping or bursting the casing is avoided.

The casing of oil, salt, and other Artesian wells consists of a pipe somewhat less in diameter than the bore of the well, and which extends down from the mouth of the well to a point below the fresh-water streams. A seed-bag or other packing is placed around the lower end of the casing, (which may be a string of four or five hundred feet,) to exclude the surface-water from the well-chamber below the casing.

Should the well prove unproductive it becomes desirable to remove and save the casing; but this is often difficult, and frequently almost impossible, owing to the wedging of the seed-bag, and rock, sediment, and dirt which has fallen, and becomes packed around the casing.

The method first adopted to remove the casing was by exploding torpedoes near the bottom, which disjointed the sections, and then removing the sections down to where it had been disjointed. A second method was by the application of jacks to the top of the casing; but both methods frequently so injured the casing as to render it comparatively worthless, and were superseded by casing-cutters, which cut the casing at or just above the obstructions, so that all the casing above the cut could be removed in good condition. In all said methods, however, a portion of the casing remained in the well, which, if the well is not abandoned, must be subsequently removed, either by a "spear" or by drilling, which portion is a dead loss, and causes much trouble and labor.

The object of my invention is to remove casing from oil and other Artesian wells by jarring with ordinary drilling-jars, with a hold within near the bottom of the casing, (where the sticking usually occurs,) and at the same time supporting the weight of the casing from above while the jarring is done, thus obviating the necessity of cutting the casing and the liability of stripping, bursting, or telescoping the casing.

I will now proceed to describe my invention, so that others skilled in the art to which it appertains may apply the same.

In the annexed drawing, S is a solid, square, tapering iron stem, with pin on top to fit ordinary drilling-tools, and conical guide at bottom, with shoulders *zz*, to prevent the wickers from going too far down, which would burst the casing when it sticks too hard. The four wickers *w w* are secured by reins R R to a square collar, N, which works up and down on the stem S. One or more steel springs, L, are inserted in the stem, to catch in slots *x* in the inside of the square collar, so that on down-jarring the wickers can be caught up and supported by the springs L, and the tool withdrawn. The eye *y* on the square collar secures a line or wire with which to lift wickers in case of accident to the springs. The loose collar K is screwed on and off, so that the wickers may be removed when necessary.

Fig. 3 shows the method of taking the weight of the casing C from above. The yoke M is secured by two chains, *b*, to clamps Q, at a sufficient distance apart to allow jarring to be done by working the beam B, to which the temper-screw T is attached, in the usual way to drilling-cable and drilling-tools.

The operation of my devices is as follows: The casing having been secured by means of the clamp Q, so that its weight is supported from above, the spear is fastened to the ordinary or any approved jarring-tools, and lowered into the casing the desired distance, when the tapering stem is raised by means of the rope, permitting the slides or wickers *w w* to come opposite the greatest diameters, or to expand and gripe the casing, the descent of the wickers being limited by the shoulders *z z*, which prevent the stem being drawn past. While the spear is thus fixed the jars are used in the ordinary manner, and the casing, being supported from above, cannot burst or sag down and telescope.

When the spear is to be withdrawn or its position changed, the stem S is lowered until the spring or springs L catch in slots *x*, which will bring and sustain the wicker opposite the smaller diameter of the stem, and permit of the movement up or down of the spear.

Having thus described my invention, what I claim, and desire to secure by Letters Patent, is—

1. The method herein described for drawing the casing of oil and similar wells, which consists in jarring within and near the bottom of the casing, while the weight of the casing is supported from above, substantially as specified.

2. A casing-spear having expansible griping-slides or wickers, connected and operating together, and projections or similar devices for limiting the downward movement of the wickers, substantially as specified.

3. A casing-spear having expansible griping-slides or wickers, and a device or devices adapted to be operated from or by the spear-stem, substantially as described, for supporting the wickers during the withdrawal of the spear.

4. The combination, in a casing-spear, of the square stem, the wickers connected by a collar, and a spring or springs for locking up the wickers, substantially as specified.

5. The combination, with the casing-spear and jar mechanism operating within the casing, of the clamp for supporting the casing while the jarring is done, substantially as specified.

In witness whereof I, the said VICTOR GRETTER, of Richland township, (St. Petersburg P. O.,) Clarion county, and State of Pennsylvania, have hereunto set my hand.

VICTOR GRETTER.

Witnesses:

F. W. RITTER, Jr.,
JAMES I. KAY.